Figure 1:
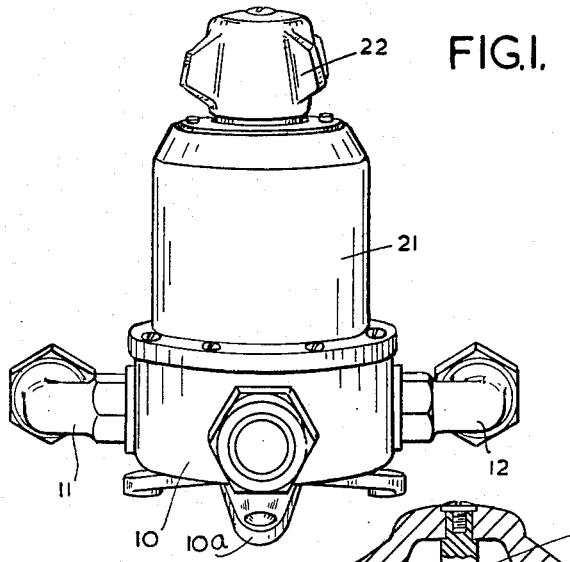

April 4, 1961

L. C. MEYNELL 2,977,989

MIXING VALVES FOR CONTROLLING THE
MIXING OF HOT AND COLD FLUIDS

Filed March 4, 1959

3 Sheets-Sheet 1

Inventor:
Lionel Charles Meynell
KENWAY, JENNEY, WITTER & HILDRETH
Attorneys

April 4, 1961

L. C. MEYNELL 2,977,989

MIXING VALVES FOR CONTROLLING THE
MIXING OF HOT AND COLD FLUIDS

Filed March 4, 1959

3 Sheets-Sheet 2

Inventor:
Lionel Charles Meynell

KENWAY, JENNEY, WITTER & HILDRETH
Attorneys

April 4, 1961

L. C. MEYNELL 2,977,989

MIXING VALVES FOR CONTROLLING THE MIXING OF HOT AND COLD FLUIDS

Filed March 4, 1959

3 Sheets-Sheet 3

Inventor:
Lionel Charles Meynell
KENWAY, JENNEY, WITTER & HILDRETH
Attorneys

United States Patent Office 2,977,989
Patented Apr. 4, 1961

2,977,989
MIXING VALVES FOR CONTROLLING THE MIXING OF HOT AND COLD FLUIDS

Lionel Charles Meynell, Wolverhampton, England, assignor to Meynell & Sons, Ltd., Wolverhampton, England, a corporation of Great Britain and Northern Ireland Filed Mar. 4, 1959, Ser. No. 797,148
Claims priority, application Great Britain Jan. 3, 1959
12 Claims. (Cl. 137—630.19)

This invention has reference to improvements relating to mixing valves for controlling the mixing of hot and cold fluids and is concerned more particularly but not specifically with mixing valves for providing a supply of water at a desired temperature for shower bath cabinets, ablution blocks and similar installations or establishments.

The present invention has for its primary object to provide an improved mixing valve for hot and cold water for the purposes aforesaid which is simple in construction, efficient and trouble-free in operation and capable of being produced in a compact and attractive form to match contemporary designs of shower bath cabinets, ablution blocks and the like.

Accordingly the invention consists of an improved mixing valve for hot and cold fluids which is characterised in that the hot and cold fluids have communication with the opposite ends of a passageway in which is located a manually controllable double acting valve which can be actuated to occasion the complete or the partial cut-off of hot and cold fluid inlets as may be desired to attain the desired temperature at the outlet and in that a master valve is associated with the said double acting valve for occasioning the complete cut-off of all fluid when required.

The invention also resides in a mixing valve as aforesaid in which provision is made for ensuring that on initial operation of the control means cold fluid only will be discharged from the outlet.

The invention further resides in the provision in conjunction with the improved mixing valve as aforesaid of means for ensuring a cut-off of the hot fluid supply in the event of failure or partial failure of the cold fluid supply.

The invention still further resides in a mixing valve for hot and cold fluids constructed, arranged and adapted for use substantially as will be described hereinafter.

An embodiment of the invention will now be described with particular reference to the accompanying drawings which illustrate the invention as applied to a mixing valve specifically intended for providing a supply of water at a desired temperature to shower bath cabinets, ablution blocks and similar installations or establishments.

Figure 2:
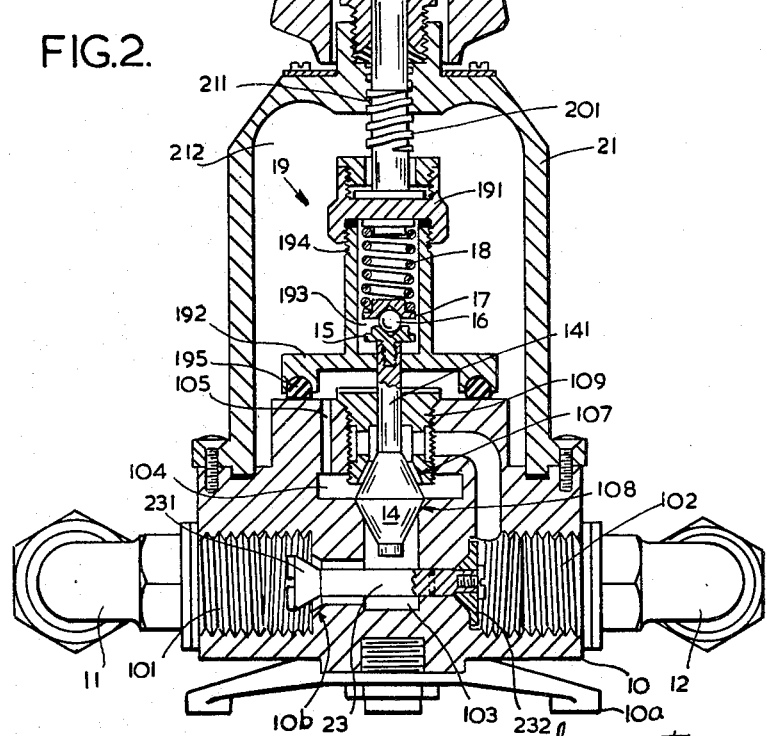
Figure 3:
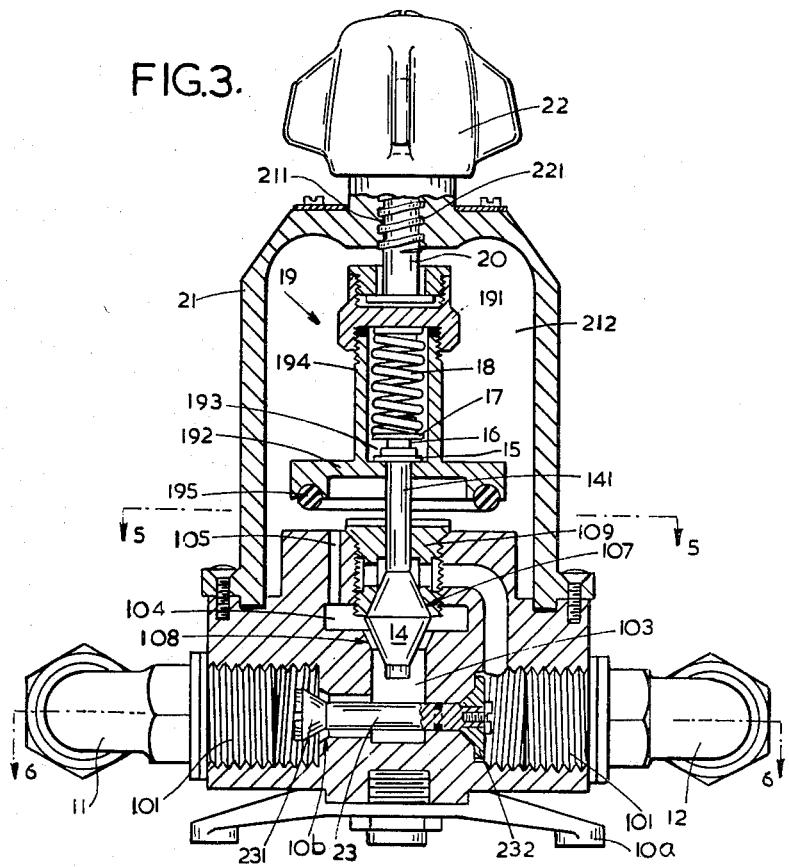
Figure 4:
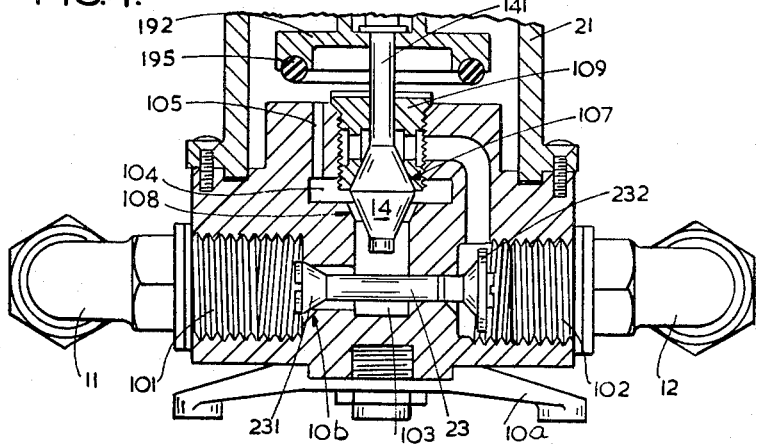
Figure 5:
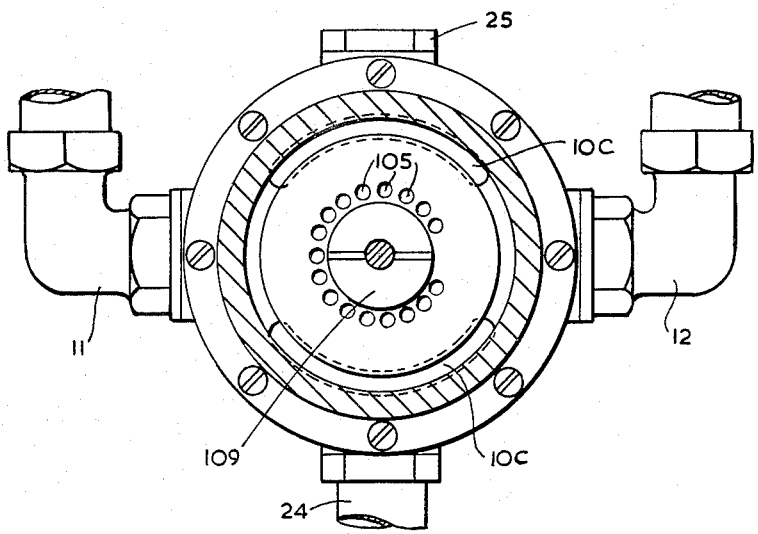
Figure 6:
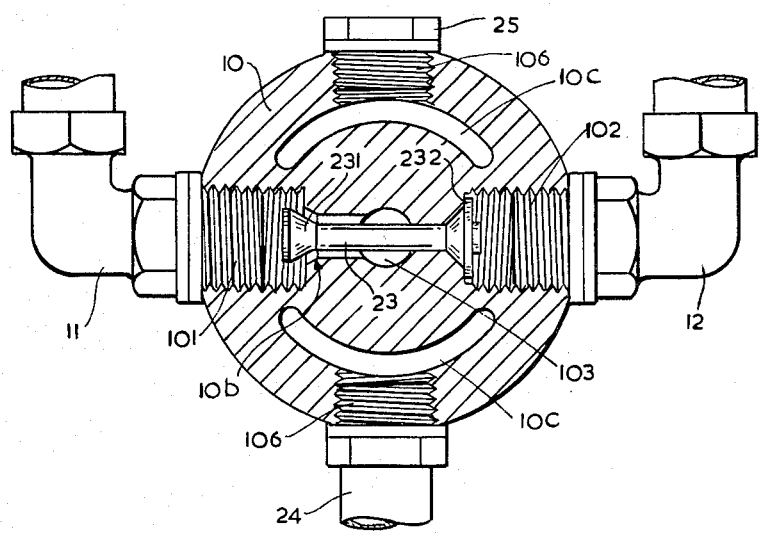

In the drawings:

Figure 1 is a perspective view of the improved mixing valve,

Figure 2 is a view partly in elevation but mainly in vertical section and on an enlarged scale of the mixing valve illustrated in Figure 1 showing the disposition of the parts when the valve is in the shut-down condition, Figure 3 is a view generally similar to Figure 2 but showing the disposition of the parts when the valve is in the open condition, Figure 4 is a fragmentary view mainly in vertical section illustrating the action of a safety device for cutting off the hot water supply in the case of failure of the cold water supply in a mixing valve constructed as illustrated in Figures 2 and 3, Figure 5 is a section taken on the plane indicated by the line 5—5 Figure 3 looking in the direction of the arrows to the said line, Figure 6 is a section taken on the plane indicated by the line 6—6 Figure 3 looking in the direction of the arrows to the said line.

In the drawings, where appropriate, like numerals of reference are employed to indicate similar parts in the several views.

According to the illustrated embodiment of the invention the improved mixing valve incorporates a cylindrical base block 10 provided at opposed axially aligned portions with horizontal inlet passages 101, 102 to which may be connected respectively by way of an elbow pipe 11 a pipe line from the hot water supply and by way of an elbow pipe 12 a pipe line from the cold water supply.

The passages 101, 102 aforesaid communicate with opposite ends of a common vertical passageway 103 which has communication with a surrounding mixing chamber 104 and by way of the said mixing chamber 104 and auxiliary passages 105 and a distribution chamber with an outlet 106 as will be described more particularly hereinafter.

The common passageway 103 is provided with valve seatings 107, 108 for co-operation with the opposed ends of a double acting duplex cone valve 14 hereinafter termed the mixture control valve 14 which is made of a resilient but heat resisting material conveniently a synthetic rubber the upper valve seating 107 being associated with the upper or cold water section of the common passageway 103 whilst the lower valve seating 108 is associated with the lower or hot water section of the said common passageway.

The mixture control valve 14 is moulded on to a valve stem 141 which is reciprocably mounted in bearings formed in a plug 109 screwed into the base block 10 aforesaid.

At its upper end the valve stem 141 of the mixture control valve 14 has seated therein a thrust member 15 having in the centre thereof a seating for part of a spherical ball 16 the opposed part of which takes a seating in a thrust member 17 which serves also as an abutment for one end of a vertically arranged coil spring 18 the other end of which takes an abutment on the end of a plug 191 which is screwed on to the upstanding hollow stem of a valve hereinafter termed the master control valve 19 having a cylindrical head 192, said thrust members 15, 17 and springs 18 being housed within the hollow interior 193 of the stem 194 of the said master control valve 19.

The master control valve 19 is provided on the underside of the head with sealing means 195 which takes a bearing on the upper surface of the base block 10 for ensuring a total cut-off of fluid when required and in a manner which will be described hereinafter.

The length of the stem 141 of the mixture control valve 14 is such that when the said valve 14 is in the "shutdown" position, see Figure 2, there is a lost motion space between the flanged head of the thrust member 15 on the end of the said stem 141 and the bottom of the hollow interior of the stem 194 of the master control valve 19.

Rotatably but non-displaceably connected to the plug 191 aforesaid is an actuating spindle 20 having an intermediate screw-threaded portion 201 which co-operates with a screw box 211 formed at the upper end of a domed housing 21 which is screwed at its lower end to the base block 10. The upper end of the actuating spindle 20 projects through a fluid tight gland associated with the top of the housing 21 and has a capstan head 22 fitted thereto.

The space 212 within the housing which serves as the fluid distribution chamber aforesaid, has communication by way of an annular recess 196 on the underside of the head 195 of the master control valve 19 and a concentric ring of vertical ports bored in the base block constituting the auxiliary passages 105 to which reference has already been made with the mixing chamber 104 which surrounds that part of the common passageway 103 intermediate the opposed seatings for the mixture control valve 14.

The base block 10 has screwed to the bottom thereof a three armed fixing bracket 10a.

The base block 10 is provided also with bearings for a horizontally disposed valve 23 hereinafter termed the safety valve 23 one end of which is provided with a head 231 which co-operates with a valve seating 10b in the inlet passage 101 for the hot water whilst the other end is provided with a head 232 which is located within the inlet passage 102 for the cold water, the head 232 in the cold water inlet passage 102 being of greater effective area than the effective area of the head 231 in the hot water inlet passage 101.

The fluid distribution chamber 212 opens into arcuate passages 10c in the base block 10 which in turn communicate with the pair of oppositely disposed outlets 106 in the base block 10. Two outlets 106 are provided so as to facilitate installation, the chosen outlet 106 being connected to the outlet pipe 24 whilst the unwanted outlet 106 is closed by a screw plug 25.

The mixing valve is operated in the following manner:

In the "shut-down" position, see Figure 2, the undersurface of the head 192 of the master control valve 19 is forced into fluid tight contact with the upper surface of the base block 10.

When it is desired to draw off water the capstan head 22 is turned in the direction for opening thereby occasioning lifting of the master control valve 19 and in the initial opening stage the placing of the cold water passage 102 only in communication with the mixing chamber 104 since the spring 18 acting through the thrust members 17, 15 and ball 16 maintains the lower end of the mixture control valve 14 closed on to its seating 108 so that the hot water supply is cut off.

As rotation of the capstan head 22 proceeds the bottom of the interior of the tubular stem 194 of the master valve 19 comes into contact with the lower thrust member 15 and on subsequent rotation exerts a lifting action on the valve stem 141 of the mixture control valve 14 which results in the lower end of the said valve 14 being lifted off the seating 108 associated with the hot water section of the common passageway and a proportionate closing of the other end of the said valve 14 on to the seating 107 associated with the cold water section of the common passageway 103, see Figures 3 and 4, so that by manipulating the said capstan head 22 water at a desired temperature can be caused to be discharged at the outlet 106.

Since the effective area of the head 232 of the safety valve 23 which is located in the cold water inlet passage 102 is greater than the effective area of the head 231 of the safety valve 23 which is located in the hot water inlet passage 101 the safety valve 23 will be actuated in a manner such that so long as the pressure in the cold water inlet passage 102 is normal the valve head 231 in the hot water inlet passage 101 will be moved completely off its seating 10b so as to permit unrestricted passage of the hot water, see Figures 2 and 3, whilst in the event of failure or partial failure of the cold water supply the pressure in the hot water inlet passage 101 will exceed that in the cold water inlet passage so that the valve head 231 in the hot water supply passage 101 will be closed on to its seating 10b to cut-off the hot water supply, see Figure 4.

It will be understood that complete cut-off is effected by turning the capstan head 22 in the closing direction until the master control valve 19 is forced on to its seating on the base block 10 and thereby to occasion a complete cut-off.

A mixing valve as hereinbefore described is simple in construction, efficient and substantially trouble-free in use and is capable of being produced in compact form and of materials which can be chosen to match a contemporary design of shower bath cabinets, ablution blocks and similar installations or establishments.

I claim:

1. A mixing valve for hot and cold fluids incorporating a base, a housing secured to said base, a common passageway in said base, an inlet for hot fluid communicating with one end of said common passageway, an inlet for cold fluid communicating with the opposite end of said common passageway, opposed valve seatings incorporated in said common passageway, one valve seating being associated with the section of the common passageway which is in communication with the hot fluid inlet whilst the other valve seating is associated with the section of the common passageway which is in communication with the cold water inlet, a double acting valve axially displaceable within the common passageway and adapted to co-operate with the valve seatings aforesaid, manually operable means for controlling the action of said double acting valve, a common mixing chamber surrounding said common passageway, passage means for placing said common mixing chamber in communication with a mixed fluid distribution chamber constituted by the interior of the housing aforesaid, a master valve actuable by said manually controlled means for opening and closing communication between the fluid distribution chamber and the common mixing chamber by way of the passage means aforesaid and an outlet for the mixed fluids leading from said fluid distribution chamber for the mixed fluid, said master valve being associated with the double acting valve in such a manner that on the initial manipulation of the manually operable control means for opening purposes the double acting valve is not actuated until after the master valve has first commenced to open.

2. A mixing valve for hot and cold fluids as claimed in claim 1 in which the double acting valve is of a double cone formation and is made of a resilient plastic material which is moulded on to a rigid stem.

3. A mixing valve for hot and cold fluids as claimed in claim 1 in which two outlets are provided to facilitate fitting and in which provision is made for sealing the outlet which will be unwanted after fitting.

4. A mixing valve for hot and cold fluids as claimed in claim 1 in which the base is provided with fixing means.

5. A mixing valve for hot and cold fluids incorporating a base, a housing secured to said base, a common passageway in said base, an inlet for hot fluid communicating with one end of said common passageway, an inlet for cold fluid communicating with the opposite end of said common passageway, opposed valve seatings incorporated in said common passageway, one valve seating being associated with the section of the passageway which is in communication with the hot fluid inlet whilst the other valve seating is associated with the section of the common passageway in communication with the cold water inlet, a double acting valve axially displaceable within the common passageway and adapted to co-operate with both the valve seatings aforesaid, and which when the mixing valve is "shut" tends to be maintained seated on the seating of the hot fluid inlet, manually operable means for controlling the action of said double acting valve, a common mixing chamber surrounding said common passageway, passage means for placing said common mixing chamber in communication with a mixed fluid distribution chamber constituted by the interior of the housing aforesaid, a master valve which is positively actuable by said manually controlled means for opening and closing communication between the fluid distribution chamber and the common mixing chamber by way of the passageway aforesaid, said master valve being associated with the double acting valve in such a manner that on the initial manipulation of the manually operable control means for opening purposes the double acting valve is retained on the seating of the hot water inlet until after the master valve has first commenced to open and an outlet for the mixed fluids leading from said fluid distribution chamber, the association aforesaid between the master valve and the double acting valve ensuring that on initial operation of the manually operable control means cold fluid only will be discharged from the outlet.

6. A mixing valve for hot and cold fluids incorporating a base, a housing secured to said base, a common passageway in said base, an inlet for hot fluid communicating with one end of said common passageway, an inlet for cold fluid communicating with the opposite end of said common passageway, opposed valve seatings incorporated in said common passageway, one valve seating being associated with the section of the common passageway which is in communication with the hot fluid inlet whilst the other valve seating is associated with the section of the common passageway which is in communication with the cold water inlet, a double acting valve axially displaceable within the common passageway and adapted to co-operate with both the valve seatings aforesaid, manually operable means for controlling the action of said double acting valve, indirect means interposed between said manually operable control means and said double acting valve which tends to maintain the double acting valve closed on to the hot water inlet seating during initial operation of said manually operable means, a common mixing chamber surrounding said common passageway, passage means for placing said common mixing chamber in communication with a mixed fluid distribution chamber constituted by the interior of the housing aforesaid, a master valve positively actuable by said manually controlled means for opening and closing communication between the fluid distribution chamber and the common mixing chamber by way of the passage means aforesaid and which on initial manipulation of the manually controlled means for opening commences to open to permit cold water flow whilst the aforesaid indirect means maintains the double acting valve closed on to the hot water inlet seating, and an outlet for the mixed fluids leading from said fluid distribution chamber.

7. A mixing valve for hot and cold fluids incorporating a base, a housing secured to said base, a common passageway in said base, an inlet for hot fluid communicating with one end of said common passageway, an inlet for cold fluid communicating with the opposite end of said common passageway, opposed valve seatings incorporated in said common passageway, one valve seating being associated with the section of the common passageway which is in communication with the hot fluid inlet whilst the other valve seating is associated with the section of the common passageway which is in communication with the cold water inlet, a double acting valve axially displaceable within the common passageway and adapted to co-operate with both the valve seatings aforesaid, manually operable means for controlling the action of said double acting valve, indirect means interposed between said manually operable control means and the double acting valve for communicating the control movements of said manually operable control means to said double acting valve, a common mixing chamber surrounding said common passageway, passage means for placing said common mixing chamber in communication with a mixed fluid distribution chamber constituted by the interior of the housing aforesaid, a master valve positively actuable by said manually controlled means for opening and closing communication between the fluid distribution chamber and the common mixing chamber by way of the passage means aforesaid, and an outlet for the mixed fluids leading from said fluid distribution chamber said indirect means affording a lost motion association between said manually operable control means and the master valve whereby on an initial opening of the master valve the indirect means maintains the double acting valve closed on the seating associated with the section of the common passageway which is in communication with the hot fluid inlet thereby ensuring that on initial operation of the manually operable control means cold fluid only will be discharged from the outlet.

8. A mixing valve for hot and cold fluids incorporating a base, a housing secured to said base, a common passageway in said base, an inlet for hot fluid communicating with one end of said common passageway, an inlet for cold fluid communicating with the opposite end of said common passageway, opposed valve seatings incorporated in said common passageway, one valve seating being associated with the section of the common passageway which is in communication with the hot fluid inlet whilst the other valve seating is associated with the section of the common passageway which is in communication with the cold water inlet, a double acting valve axially displaceable within the common passageway and adapted to co-operate with the valve seatings aforesaid, manually operable means for controlling the action of said double acting valve, indirect means interposed between said manually operable control means and the double acting valve for communicating the control movements of said control means to said double acting valve means, a common mixing chamber surrounding said common passageway, passage means for placing said common mixing chamber in communication with a mixed fluid distribution chamber constituted by the interior of the housing aforesaid, a master valve positively actuable by said manually operable control means for opening and closing communication between the fluid distribution chamber and the common mixing chamber by way of the passage means aforesaid, and an outlet for the mixed fluids leading from said fluid distribution chamber said indirect means affording a lost motion association between said manually operable control means and the master valve whereby on an initial opening of the master valve the indirect means maintains the double acting valve closed on the seating associated with the section of the common passageway which is in communication with the hot fluid inlet thereby ensuring that on initial operation of the manually operable control means cold fluid only will be discharged from the outlet, the lost motion association aforesaid being such that after lost motion has been taken up by the continued actuation of the manually operable control means the master valve is caused to occasion the pick-up of the double acting valve and the movement of the said double acting valve toward or on to the valve seating associated with the section of the common passageway in communication with the cold water inlet.

9. A mixing valve for hot and cold fluids as claimed in claim 8 in which the indirect means is adapted to exert pressure on the double acting valve through the intermediary of thrust bearings and an interposed ball bearing.

10. A mixing valve for hot and cold fluids incorporating a base, a housing secured to said base, a common passageway in said base, an inlet for hot fluid communicating with one end of said common passageway, an inlet for cold fluid communicating with the opposite end of said common passageway, opposed valve seatings incorporated in said common passageway, one valve seating being associated with the section of the common passageway which is in communication with the hot fluid inlet whilst the other valve seating is associated with the section of the common passageway which is in communication with the cold water inlet, a double acting valve axially displaceable within the common passageway and adapted to co-operate with the valve seatings aforesaid, manually operable means for controlling the action of said double acting valve, spring means interposed between said manually operable control means and the double acting valve for communicating the control movements of said manually operable control means to said double acting valve means, a common mixing chamber surrounding said common passageway, passage means for placing said common mixing chamber in communication with a mixed fluid distribution chamber constituted by the interior of the housing aforesaid, a master valve positively actuable by said manually operable control means for opening and closing communication between the fluid distribution chamber and the common mixing chamber by way of the passage means aforesaid, an outlet for the mixed fluids leading from said fluid distribution chamber, said spring means affording a lost motion association between said manually operable control means and the master valve whereby on an initial opening of the master valve the spring means maintains the double acting valve closed on the seating associated with the section of the common passageway which is in communication with the hot fluid inlet thereby ensuring that on initial operation of the manually operable control means cold fluid only will be discharged from the outlet.

11. A mixing valve for hot and cold fluids incorporating a base, a housing secured to said base, a common passageway in said base, an inlet for hot fluid communicating with one end of said common passageway, an inlet for cold fluid communicating with the opposite end of said common passageway, opposed valve seatings incorporated in said common passageway, one valve seating being associated with the section of the common passageway which is in communication with the hot fluid inlet whilst the other valve seating is associated with the section of the common passageway which is in communication with the cold water inlet, a double acting valve axially displaceable within the common passageway and adapted to co-operate with the valve seatings aforesaid, manually operable means for controlling the action of said double acting valve, spring means interposed between said manually operable control means and the double acting valve for communicating the control movements of said manually operable control means to said double acting valve means, a common mixing chamber surrounding said common passageway, passage means for placing said common mixing chamber in communication with a mixed fluid distribution chamber constituted by the interior of the housing aforesaid, a master valve positively actuable by said manually operable control means for opening and closing communication between the fluid distribution chamber and the common mixing chamber by way of the passage means aforesaid, an outlet for the mixed fluids leading from said fluid distribution chamber, said manually operable control means affording a lost motion association between said spring means and the double acting valve whereby on an initial opening of the master valve the spring means maintains the double acting valve closed on the seating associated with the section of the common passageway which is in communication with the hot fluid inlet thereby ensuring that on initial operation of the manually operable control means cold fluids only will be discharged from the outlet, the lost motion association aforesaid being such that after lost motion has been taken up by the continued actuation of the manually operable control means the master valve is caused to occasion the pick-up of the double acting valve and the movement of the said double acting valve toward or on to the valve seating associated with the section of the common passageway in communication with the cold water inlet.

12. A mixing valve for hot and cold fluids as claimed in claim 11 in which the master valve is provided on the acting face with a recess which is in communication with the common mixing chamber by means of the passage means aforesaid and in which the said acting face is provided with sealing means which bounds the said recess and provides for a fluid tight sealing when the master valve is in the closed position.

References Cited in the file of this patent

UNITED STATES PATENTS

| 752,241 | Master | Feb. 16, 1904 |
| 1,842,825 | Cunningham | Jan. 26, 1932 |
| 1,912,295 | Mintz | May 30, 1933 |
| 2,106,568 | Iacino | Jan. 25, 1938 |
| 2,308,127 | Symmons | Jan. 12, 1943 |
| 2,317,717 | Bauman | Apr. 27, 1943 |
| 2,768,643 | Acomb | Oct. 30, 1956 |
| 2,888,942 | Couchot | June 2, 1959 |

FOREIGN PATENTS

| 528,080 | Germany | June 25, 1931 |
| 138,367 | Australia | Aug. 16, 1950 |